Nov. 4, 1941.   E. A. GRANGE ET AL   2,261,465
METHOD OF MAKING WHEELS WITH RUBBERLIKE TREADS
Original Filed Nov. 23, 1935   2 Sheets-Sheet 1
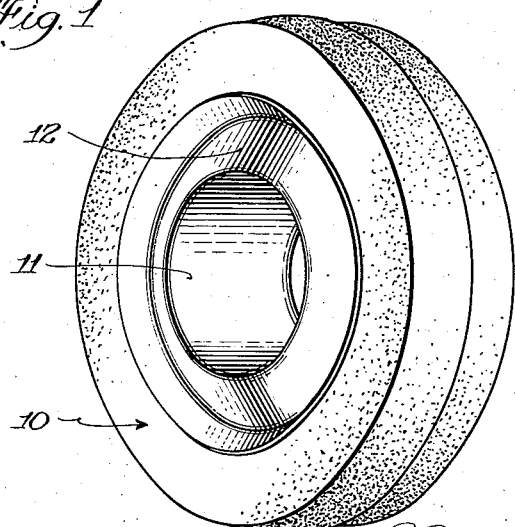
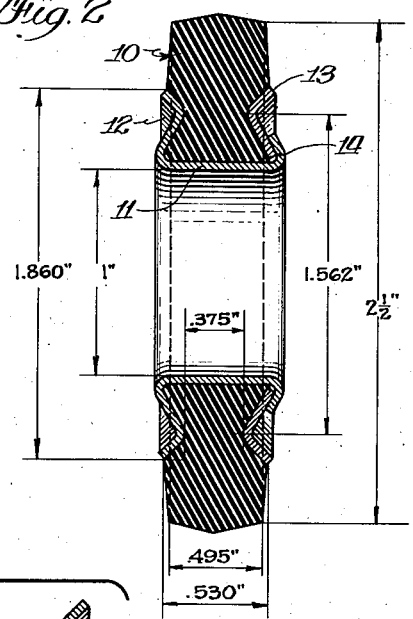
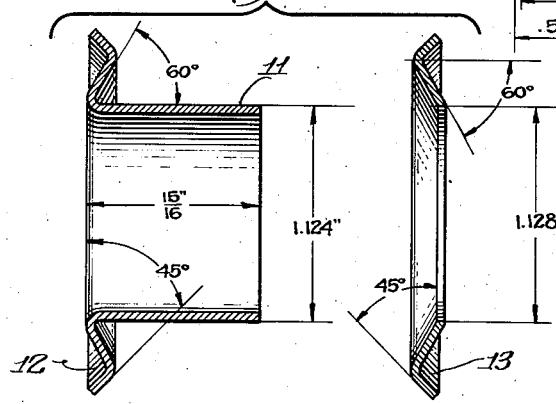
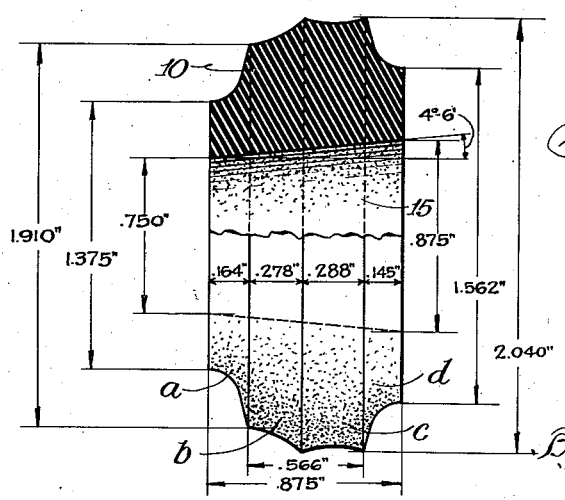
Inventors:
Edward A. Grange,
Alexander F. Kaptiller
and
Erwin J. Schmidt
By: Fricke & DeBusk
Atty's.

Nov. 4, 1941.  E. A. GRANGE ET AL  2,261,465
METHOD OF MAKING WHEELS WITH RUBBERLIKE TREADS
Original Filed Nov. 23, 1935   2 Sheets-Sheet 2
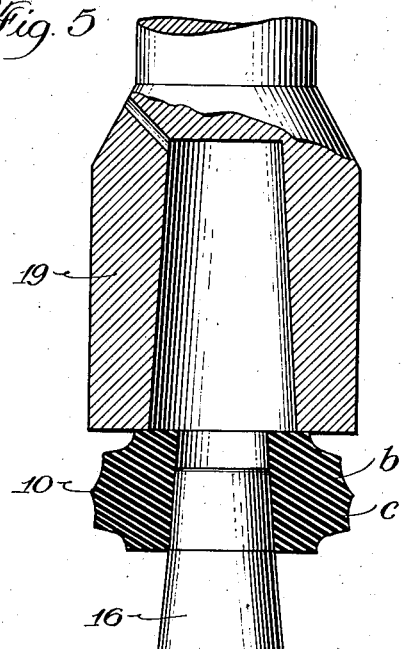
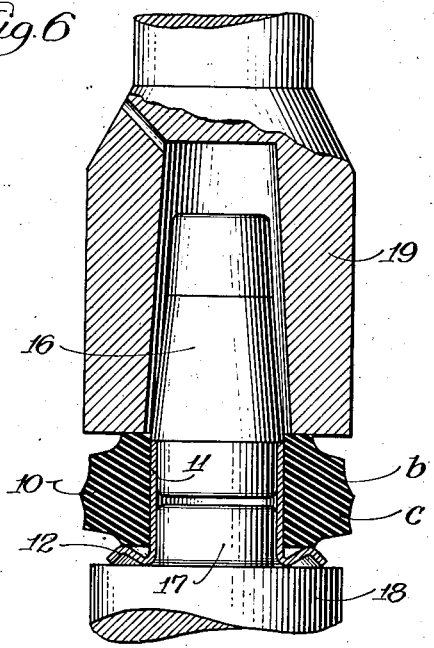
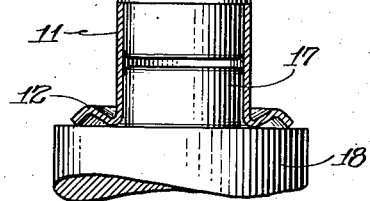
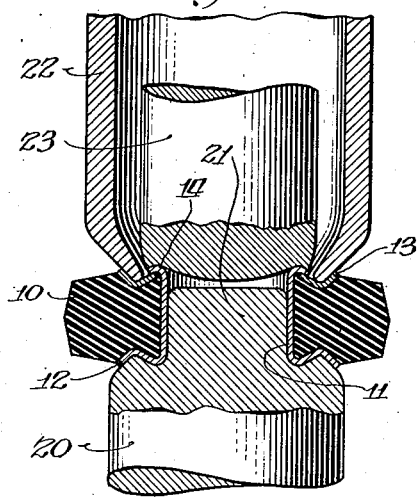
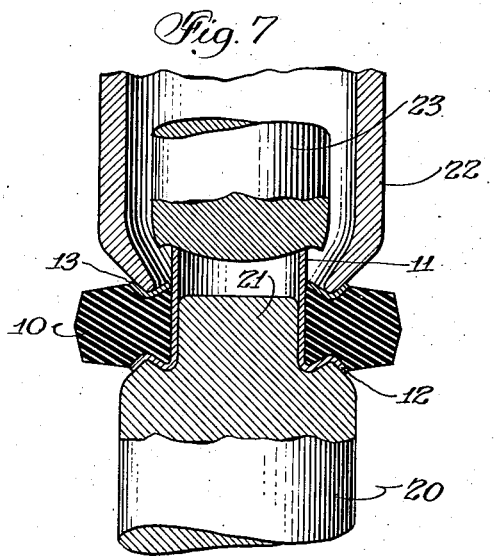
Inventors:
Edward A. Grange,
Alexander F. Kaptuller
and
Erwin J. Schmidt
By: Fricke & DeBuck
Attys.

Patented Nov. 4, 1941

2,261,465

UNITED STATES PATENT OFFICE 2,261,465

METHOD OF MAKING WHEELS WITH RUBBERLIKE TREADS

Edward A. Grange, Alexander F. Kaptuller and Erwin J. Schmidt, Chicago, Ill., assignors to Allied Engineering Company, Chicago, Ill., a corporation of Illinois Original application November 23, 1935, Serial No. 51,318, now Patent No. 2,152,684, dated April 4, 1939. Divided and this application September 1, 1937, Serial No. 162,042

12 Claims. (Cl. 29—159.01)

This application is being filed as a division of our prior application Serial No. 51,318 filed November 23, 1935, now Patent 2,152,684 of April 4, 1939.

Our invention has for its object the provision of a new and improved method of producing wheels of the type set forth and claimed in the application of Erwin J. Schmidt, Serial No. 700,869 filed December 4, 1933, now Patent No. 2,089,986 of August 17, 1937, and the application of Edward A. Grange and said Schmidt, Serial No. 49,880 filed November 15, 1935, now Patent No. 2,100,542 of November 30, 1937, said Schmidt and said Grange being two of the present applicants.

It is one of the objects of our invention to provide an improved method of making wheels whereby a tread member of soft or flexible rubber or other similarly functioning material and its mounting and gripping means shall have such relation to each other that the tread member is stretched or expanded circumferentially for its preliminary mounting on the supporting member and is then further expanded circumferentially and compressed axially by the operation of moving the gripping means into their operative holding position, the tread member being given such initial size and shape and other characteristics that in the final product the gripped tread member shall be of the desired size and shape for commercial use without the necessity for any trimming or other reshaping of the tread member before putting the wheel into service. It is another object of our invention to provide an improved method of this type whereby the tread member in its final gripped form shall be of such changed size and shape as compared with its initial size and shape and shall have the points of varying tension and compression so arranged at the different points about the wheel that the tread member shall be held firmly by the mounting and gripping means so as to prevent any creepage of the tread member circumferentially or radially with respect to the mounting and gripping means. It is still another object of our invention to provide an improved method of this type whereby the tread member in the finished wheel shall be held supported and gripped under tension in such manner that in the use of the wheel there shall be no permanent distortion or displacement of the material of the tread member in any direction as compared with the operative finished wheel condition,—even when the wheel is subjected to heavy stresses such as characterize the use of the device as one of the supporting wheels on a roller skate worn by a heavy and powerful man skating and turning corners sharply at high speed. It is another object of our invention to provide an improved method of producing a wheel by virtue of which, under the hardest sort of usage, the tread member will wear uniformly about the entire periphery of the wheel without any tendency for the production of flat spots at any points thereabout.

It is a further object of our invention to provide an improved method of producing the type of wheel aforesaid whereby the tread material will be gripped tightly and be held securely in position and still be free to yield or flow circumferentially between the supporting and gripping flanges as may be necessary when radial compression of the tread material takes place under the weight of the skater, and whereby said tread material will move backwardly again freely to its normal position and condition when the radial pressure is removed so as to insure that there shall be no cumulative building up of stretching effects in any part of the tread material by reason of successive repetitions of the application and removal of radial pressure on the tread when the wheel is in service. To this end, it is one of the objects of our invention to provide for the use of an improved form of flange members by which the desired support shall be insured for the tread material and the desired grip effected thereon without danger of the parts causing any decrease in the strength or the durability of the tread material.

Another object of our invention is to provide an improved method of insuring that the rubber or similar material making up the tread member shall move substantially uniformly so as to fill satisfactorily all parts of the outwardly open circumferentially extending channel between the flanges as the tread member is placed in position upon the supporting member and the flanges are then moved inwardly with respect to each other into their operative gripping position for holding the tread member expanded and compressed on its supporting member.

It is a further object of our invention to improve methods of the types described in sundry details hereinafter pointed out. The preferred means by which we have accomplished our several objects are illustrated in the drawings and are hereinafter specifically described. That which we believe to be new and desire to cover by Letters Patent is set forth in the claims.

In the drawings:

Fig. 1 is a perspective view of the preferred form of our completed wheel;

Fig. 2 is a central vertical sectional view through the wheel of Fig. 1;

Fig. 3 is a central vertical sectional view through the sleeve and flanges employed in the arrangement of Fig. 2 for supporting and gripping the tread member of the wheel, the parts being shown in separated condition;

Fig. 4 is an edge elevational view of the tread member in its original shape before expansion and compression, a portion being broken away for clearness of illustration;

Fig. 5 is a view showing the preferred form of means employed for forcing the tread member into position upon the supporting member therefor, the tread member and supporting member and some of the operating parts being shown in cross section;

Fig. 6 is a view similar to Fig. 5 but showing the tread member in position upon the supporting member;

Fig. 7 is a view showing the preferred form of means employed for pressing the loose flange into position on the supporting member so as to compress the tread member axially and for securing the loose flange in position, the tread member, the supporting member, the flanges, and some of the operating parts being shown in vertical section; and Fig. 8 is a view similar to Fig. 7 but showing the parts in their position at the close of the operation of securing the loose flange in position.

Referring now to the several figures of the drawings, in which corresponding parts are indicated by the same reference characters, 10 indicates the tread member of our improved wheel as shown in Fig. 1, such tread member being mounted upon a supporting member 11 which, in the arrangement shown, is in the form of a sleeve and end flanges 12 and 13, the flange 12 being formed integrally with the sleeve 11 as is best shown in Fig. 3, and the flange 13 being in the form of a washer having its opening of a size to fit snugly over the sleeve 11. In the arrangement shown, the flange 13 is secured in position upon the end of the sleeve 11 opposite that at which the flange 12 is mounted by means of a rolled over bead portion 14 of the sleeve 11.

In the arrangement shown, the tread member 10 is originally of a very different form from that of the tread member in the completed wheel, as is apparent by a comparison of Figs. 2 and 4 which are drawn upon the same scale. The tread member 10 is preferably molded of soft or flexible rubber of a quality comparable to that used in the treads of high-grade automobile tires and is of a hardness of from 60 to 75 points as indicated by a Shore instrument. We prefer to use rubber of the quality mentioned and of approximately 68 Shore hardness in our wheels for use on roller skates. As will be readily appreciated from an examination of the drawings and particularly Fig. 4, the tread member 10 is in the form of a ring having a tapered opening 15 axially therethrough, the walls of the opening being tapered from a true cylindrical form by an angle of approximately 4° at each side of such cylinder. The ring is made solid in form,—that is, with the rubber continuous and of uniform character throughout the member without any divisions between body portions at any point.

For the purposes of description, we have considered the tread member 10 as being formed of four portions, a, b, c and d, formed integrally with each other and axially in end to end relation, as is best shown in Fig. 4. The outer edge face of the portion c is generally of substantially cylindrical form, while the outer edge face of the portion b at its left in Fig. 4 is generally tapered toward the left by an angle of approximately 13° from cylindrical form. Generally the tread member as a whole is tapered from about its middle transverse plane, the meeting plane of the portions b and c, toward the left or same direction as the taper of the central opening therethrough. The outer edge faces of the portions a and d are quite sharply tapered, being positioned generally at an angle of from 31° to 32° from the transverse planes passing through the substantially parallel ends of the tread member, the taper of portion a being in the same direction as the taper of portion b while the portion d tapers in the opposite direction. The tread member as shown in Fig. 4 is made for use in a wheel of a certain size and shape designed for a roller skate, the dimensions as indicated on the drawings for the tread and supporting members being in correspondence with such designed purposes.

In the arrangement shown, the supporting sleeve 11 and the flanges 12 and 13 are preferably made in the form of stampings from sheet metal of a thickness of .062 inches, the sleeve and flange 12 being formed preferably from No. 5 dead soft cold rolled strip steel, and the part forming the flange 13 being formed from No. 2 half hard cold rolled strip steel. The inner portion of each of the flanges 12 and 13 is tapered as shown at an angle of approximately 60° from the true cylindrical form, while the outer portion of each of the flanges is tapered in the reverse direction at an angle of approximately 45° from cylindrical form. As is shown in Fig. 2, the inner portions of the flanges are tapered away from the sleeve 11 and are convergently disposed with respect to each other, while the outer portions of said flanges are tapered toward the sleeve and are divergently disposed with respect to each other.

As is seen from a comparison of Figs. 3 and 4, which are drawn upon the same scale, the diameter of the tapered opening through the tread member 10 in its normal condition, that is to say in its unexpanded and uncompressed condition, is considerably smaller than the outside diameter of the sleeve 11, the diameter of the opening being approximately thirteen-eighteenths as great as the outside diameter of the sleeve. As the result, the tread member must be expanded and stretched in order to be placed in position upon the sleeve. For carrying out this initial expanding and stretching operation, we employ a smooth tapered driftpin 16 having one end portion of a size and shape to fit the tapered opening 15 in the tread member and having the other end portion of a size and shape to fit inside the sleeve 11, the effective tapered portion of the driftpin varying from a diameter corresponding to the large end of the opening 15 in the tread member to a diameter corresponding to the outside diameter of the sleeve 11, as shown in Fig. 5. For mounting the tread member 10 upon the supporting member 11, we place the sleeve 11 in position upon a lug 17 rising from a suitable support 18, and place the larger end of the driftpin 16 in position in the upper end of the sleeve with the tread member 10 in position upon the upper or smaller end of the driftpin. A hollow pressure member 19 is then forced downwardly in contact with the flat end of the tread member 10 and the tread member is forced into position upon the sleeve as shown in Fig. 6. This serves to expand the tread member as a whole, while at the same time reducing to some extent the thickness (radially) and width (axially) of the rubber of the ring. In the arrangement shown in Fig. 6, the tread member necessarily is expanded more at the upper end adjacent the pressure sleeve 19 than at the lower or leading end adjacent the flange 12, as will be appreciated from the fact that the smaller end of the opening 15 has been expanded to the same size as that of the larger end of said opening. This has the effect of cutting down the degree of taper of the portion b of the tread member, such portion b as shown in Fig. 6 having been distorted into more nearly cylindrical form than as is shown in Fig. 5. By reason of the tapered form of the opening 15, the tread member is enabled to slide smoothly into position on the sleeve without objectionable frictional resistance between the lead end of the tread member and the sleeve and without any appreciable distortion other than the expansion as above set forth, the end face and edge face portions of the leading end of the tread member retaining substantially their normal configuration.

For compressing the tread member 10 axially and expanding it additionally diametrically, an arrangement somewhat similar to that shown in Fig. 5 is used, comprising a supporting member 20 having a seat to receive the outer face of the flange 12 and a lug 21 rising therefrom of a size to have a working fit in the sleeve 11. When it is desired to compress the tread member, the sleeve 11 and tread member 10 thereon are placed in position upon the support 20 and the lug 21, and the washer 13 is placed in operative position on the upper or top end face of the tread member. A pressure sleeve 22 is then brought down into nesting arrangement with the washer 13 and power is applied for pressing the washer downwardly into the desired operative position as shown in Fig. 7. A rotary tool 23 is then forced downwardly under heavy pressure for rolling over or pressing outwardly and downwardly the upper end of the sleeve 11 to form the bead 14 thereon for holding the flange 13 in its operative position as shown in Fig. 8. By this arrangement the tread member 10 is secured on the supporting member 11 between the flanges 12 and 13 under pressure sufficient to prevent any creepage of the tread member circumferentially or radially relative to its holding means under the severest stresses the wheel can be put to in ordinary use and yet not great enough to damage the material forming the tread member. We have found a pressure ranging from about 300 lbs. to about 700 lbs. per square inch to be satisfactory. With rubber of the type mentioned above and of a Shore hardness of approximately 68 points, we prefer a pressure of approximately 500 lbs. per square inch.

As is best indicated in Fig. 6, the parts are made of such size and shape that the line of junction between the oppositely tapered portions of the flange 12 stands substantially opposite the line of junction between the straight end face and the tapered edge face of the portion d of the tread member. In the same way, when the flange 13 is in position, the line of junction of its oppositely tapered portions stands substantially opposite the line marking the separation of the flat end from the tapered edge of the portion a of the tread member. When the flange 13 is pressed downwardly into the position shown in Figs. 7 and 8, the tread member 10 is substantially compressed axially adjacent the sleeve 11 and it is compressed to a much greater extent at the circumference corresponding to the meeting lines of the oppositely tapered portions of the respective flanges which are spaced outwardly from the sleeve. In the arrangement described, the rubber is compressed at the narrowest space between the flanges to about three-sevenths of its normal width. The compression of the inner or mounting portion of the tread member axially between the flanges causes the rubber making up the tread member to expand circumferentially and diametrically to a considerable extent, the straight outer end faces of the portions a and d being forced inwardly toward each other with the result that the tapered edge faces of said portions are brought into approximately transverse planes. The final shape of the tread member in the wheel, therefore, is radically different from that of the tread member as originally formed and before being mounted in place.

By the use of our improved method by which the opening through the tread member is given a tapered form and by which the edge portions of the member are given a predetermined differential form and shape all by producing inexpensively the member in a mold having a cavity of the shape of the tread member shown in Fig. 4, we are enabled to produce a wheel substantially symmetrical, as shown in Figs. 1, 2 and 8 of such form, shape and arrangement that it is suitable for commercial use as it comes from the press and without any trimming or other costly reshaping operations, which, it will be appreciated, is a matter of tremendous importance in the manufacture of an article used in such great quantities as wheels of the kind and type in question.

By the use of our improved arrangement of parts making up the wheel and the means for producing the wheel according to our improved method, we have produced a structure in which the tread member is held securely in position by the combination of stresses and compressive forces. The tread member is held strongly against movement circumferentially with respect to the sleeve 11 and against movement radially outwardly with respect to the flanges 12 and 13. The outer tapered or divergent portions of the flanges serve as supports for holding the outer, exposed free portion of the tread member against undue movement transversely. Notwithstanding the secure mounting of the tread member with respect to undesired movements, the tread member is free to yield inwardly without the necessity for the application of great pressure for effecting such yielding movement. By reason of the tread member being gripped and held in position by the use of an outwardly open, circumferentially extending channel of uniform size and shape about the entire periphery of the supporting means, the freedom of the tread member with respect to inward yielding and return movements is uniform about the entire periphery of the wheel.

Wheels made according to our invention are suitable for many different uses. We have found the wheels to be highly satisfactory on roller skates. By the use of skates equipped with such wheels, the skater is effectively cushioned against shocks and jolts to which the wheels of the skate are subjected when the skates pass over uneven or rough surfaces. The wheels take a velvet-like grip upon the skating surface even when such surface is quite smooth, no appreciable slippage of the wheels on the skating surface taking place due to to the skater turning sharp corners at high speeds or making quick stops. Our improved wheels operate silently, the wheels in rolling contact with a sidewalk or other skating surface under all ordinary skating conditions creating no noticeable sound. The life of our improved wheel under severe service conditions has been found to be many times greater than that of the ordinary type of steel skate wheel operating under less severe conditions.

While we have illustrated in detail and have specifically described a wheel of a certain construction and of a certain size for use in particular on roller skates, it is to be understood that such has been done merely for the purposes of illustrating the principles of our invention and teaching those skilled in the art how to produce, according to our invention, wheels for widely different uses and differing materially in shape and size. We wish it to be understood also that our invention is not limited to the particular arrangements and the particular methods illustrated and described as we recognize that changes may be made therein without departing from the principles of the invention.

We claim:

1. The method of making a wheel of the type described which comprises the steps of mounting a circular tread member of soft rubber-like material having a circular opening therethrough upon a supporting member of substantially cylindrical form and of substantially greater external diameter than the diameter of said opening by expanding the tread member to an internal diameter at least as great as the outside diameter of the supporting member and positioning the tread member on the supporting member, and then securing the tread member on the supporting member between holding elements in substantially changed form and in substantially compressed condition axially by shortening the distance between the holding elements while maintaining the holding elements and the tread member in the same rotative relation about their axes, and the preliminary step of giving the tread member such predetermined shape and size that at the end of the operations of expansion and compression the tread member shall have a substantially symmetrical form suitable for use commercially without reshaping.

2. The method of making a wheel of the type described which comprises the steps of mounting a circular tread member of soft rubber-like material having a circular opening therethrough upon a supporting member of substantially cylindrical form and of substantially greater external diameter than the diameter of said opening by expanding the tread member to an internal diameter at least as great as the outside diameter of the supporting member and positioning the tread member on the supporting member, and then securing the tread member on the supporting member between holding elements in substantially changed form and in substantially greater expanded condition diametrically and in substantially compressed condition axially by shortening the distance between the holding elements while maintaining the holding elements and the tread member in the same rotative relation about their axes, and the preliminary step of giving the tread member such predetermined shape and size that at the end of the operations of expansion and compression the tread member shall have a substantially symmetrical form suitable for use commercially without reshaping.

3. The method of making a wheel of the type described which comprises the steps of mounting a circular tread member of soft rubber-like material having a circular opening therethrough upon a supporting member of substantially cylindrical form and of substantially greater external diameter than the diameter of said opening by sliding the tread member along a tapered drift-pin into position on the supporting member, and then securing the tread member on the supporting member between holding elements in substantially changed form and in substantially compressed condition axially by shortening the distance between the holding elements while maintaining the holding elements and the tread member in the same rotative relation about their axes, and the preliminary step of giving the tread member such predetermined shape and size that at the end of the operations of expansion and compression the tread member shall have a substantially symmetrical form suitable for use commercially without reshaping.

4. The method of making a wheel of the type described which comprises the steps of mounting a circular tread member of soft rubber-like material having a circular opening therethrough upon a supporting member of substantially cylindrical form and of substantially greater external diameter than the diameter of said opening by sliding the tread member along a tapered drift-pin into position on the supporting member, and then securing the tread member on the supporting member between holding elements in substantially greater expanded condition diametrically and in substantially compressed condition axially by shortening the distance between the holding elements while maintaining the holding elements and the tread member in the same rotative relation about their axes, and the preliminary step of giving the tread member such predetermined shape and size that at the end of the operations of expansion and compression the tread member shall have a substantially symmetrical form suitable for use commercially without reshaping.

5. The method of making a wheel which comprises the utilization of a circular tread member of soft rubber-like material having an opening axially therethrough and having straight end face portions adjacent the opening substantially at right angles to the axis of the tread member and tapered end face portions adjacent the periphery of the tread member, expanding and mounting said tread member upon a supporting member of substantially cylindrical form and of substantially greater external diameter than the diameter of said opening, and then securing the tread member on the supporting member between holding elements in substantially changed form and in substantially compressed condition axially at the portion adjacent the supporting member by shortening the distance between the holding elements while maintaining the holding elements and the tread member in the same rotative relation about their axes so as to make said tapered end face portions of the tread member conform approximately to transverse planes.

6. The method of making a wheel which comprises the utilization of a circular tread member of soft rubber-like material having an opening axially therethrough and having straight end face portions adjacent the opening substantially at right angles to the axis of the tread member and tapered end face portions adjacent the periphery of the tread member, expanding and mounting said tread member upon a supporting member of substantially cylindrical form and of substantially greater external diameter than the diameter of said opening, and then securing the tread member on the supporting member between holding elements in substantially changed form and in substantially compressed condition axially at its inner mounting portion and in substantially greater compressed condition axially at a circumference outwardly spaced from the supporting member by shortening the distance between the holding elements while maintaining the holding elements and the tread member in the same rotative relation about their axes so as to make said tapered end face portions of the tread member conform approximately to transverse planes.

7. The method of making a wheel which comprises the utilization of a circular tread member of soft rubber-like material tapered from about its middle transverse plane toward one end and having an opening axially therethrough, stretching said tread member for forcing it into position on a substantially over-sized supporting member with a greater degree of expansion at the smaller end of the tread member than at the other end, and then securing the tread member between holding elements on the supporting member in substantially changed form and in substantially compressed condition axially by shortening the distance between the holding elements while maintaining the holding elements and the tread member in the same rotative relation about their axes.

8. The method of making a wheel which comprises the utilization of a circular tread member of soft rubber-like material tapered from about its middle transverse plane toward one end and having an opening axially therethrough also tapered toward the same end, stretching said tread member for forcing it into position on a supporting member of substantially cylindrical form and of substantially greater external diameter than the diameter of said opening at its smaller end with a greater degree of expansion at the smaller end of the tread member than at the other end, and then securing the tread member between holding elements on the supporting member in substantially changed form and in substantially compressed condition axially by shortening the distance between the holding elements while maintaining the holding elements and the tread member in the same rotative relation about their axes.

9. In the herein described method of making a wheel of the type described, those steps which comprise tapering from its leading end the internal walls of an annular tread member of soft rubber-like material, and then expanding and slidably mounting the tread member on a supporting member of substantially cylindrical form and of substantially greater external diameter than the diameter of said opening at its smaller end, the frictional resistance between the two members being such that the face portions of the leading end of the tread member are maintained in substantially their normal configuration.

10. In the herein described method of making a wheel of the type described, those steps which comprise tapering from its leading end at an angle of approximately 4° with respect to its axis the internal walls of an annular tread member of soft rubber-like material, and then expanding and slidably mounting the tread member on a supporting member of substantially cylindrical form and of an external diameter substantially greater than the smaller end of the tapered opening in the tread member whereby the frictional resistance between the two members is such that the face portions of the leading end of the tread member are maintained in substantially their normal configuration.

11. The method of making a wheel of the type described which comprises the steps of mounting a circular tread member of soft rubber-like material having a circular opening therethrough upon a supporting member of substantially cylindrical form and of substantially greater external diameter than the diameter of said opening by expanding the tread member to an internal diameter at least as great as the outside diameter of the supporting member and positioning the tread member on the supporting member, and then securing the tread member on the supporting member in substantially changed form and in substantially compressed condition axially between holding elements by shortening the distance between the holding elements while maintaining the holding elements and the tread member in the same rotative relation about their axes, the inner portions of the inside faces of said elements being convergently disposed with respect to each other and the outer portions of the inside faces of the elements being divergently disposed with respect to each other as viewed in cross section from the wheel axis, and the preliminary step of giving the tread member such predetermined shape and size that at the end of the operations of expansion and compression the tread member shall have a substantially symmetrical form suitable for use commercially without reshaping.

12. The method of making a wheel which comprises the utilization of a circular tread member of soft rubber-like material having an opening axially therethrough and having straight end face portions adjacent the opening substantially at right angles to the axis of the tread member and tapered end face portions adjacent the periphery of the tread member, expanding and mounting said tread member upon a supporting member of substantially cylindrical form and of substantially greater external diameter than the diameter of said opening, and then securing the tread member on the supporting member in substantially changed form and in substantially compressed condition axially at the portion adjacent the supporting member between holding elements by shortening the distance between the holding elements while maintaining the holding elements and the tread member in the same rotative relation about their axes, the inner portions of the inside faces of said elements being convergently disposed with respect to each other and the outer portions of the inside faces of the elements being divergently disposed with respect to each other as viewed in cross section from the wheel axis, so as to make said tapered end face portions of the tread member conform approximately to transverse planes.

EDWARD A. GRANGE.
ALEXANDER F. KAPTULLER.
ERWIN J. SCHMIDT.